INVENTORS
JAMES C. SAGNIS, JR.
PAUL E. STUCKERT
BY Curtis Ailes Jr.
ATTORNEY

United States Patent Office 3,551,902

Patented Dec. 29, 1970

3,551,902

MAGNETIC STRIP MEMORY

James C. Sagnis, Jr., Highland, and Paul E. Stuckert, Katonah, N.Y., assignors to International Business Machines Corporation, New York, N.Y., a corporation of New York Filed Feb. 1, 1963, Ser. No. 255,479

Int. Cl. G11c *7/00, 11/14*

U.S. Cl. 340—174 11 Claims

ABSTRACT OF THE DISCLOSURE

A conductive magnetizable strip having at least one aperture therein. A conductor is positioned within said aperture. Sources are provided for concurrently energizing said conductor and magnetizable strip so as to switch the flux in said strip around said aperture.

This invention relates to a magnetic strip memory, and more particularly to a memory in the form of a conductive magnetic strip in which magnetic storage is accomplished by establishing residual magnetic flux states within certain portions of the strip adjacent to perforations therein.

Many prior systems and structures have been proposed for the magnetic storage of information in various systems for switching, computing and data processing. However, there is always a continuing objective of producing a magnetic memory which is less expensive to fabricate, and which is more compact, without sacrifice in reliability. This is one of the objects of the present invention.

Some prior magnetic memory systems have not been completely efficient because they have not utilized more than a minor fraction of the residual flux capacity of the magnetic material of the magnetic storage structure.

Accordingly, another object of the present invention is to provide an improved magnetic memory system which is characterized by a very high utilization of the residual flux capacity of each bistable residual flux device.

One of the largest items of cost, and one of the most serious limiting factors in reducing the physical size of magnetic memory systems has been the requirement that a plurality of windings generally must thread through the central opening of each magnetic storage member. If the number of these windings can be reduced, then an immediate savings in both cost and size can be achieved.

Accordingly, it is another object of the present invention to provide a magnetic memory system in which the windings are reduced to an absolute minimum number for each magnetic storage element member.

Various proposals have been made in the past for obtaining readout signals from magnetic memory systems employing square loop materials, either by non-destructive reading, or by destructive reading. The non-destructive reading systems generally have the disability that the readout signal is necessarily much weaker than a destructive readout signal and furthermore there is a risk that after a large number of readout operations, the storage element may be at least partially demagnetized so that an error is possible. On the other hand, the destructive reading systems, which give the strongest possible readout signal, are subject to the disability that the information is destroyed by the readout operation, and if the information is to be retained, then it must be re-stored in the memory. However, re-storage generally requires considerable additional equipment to accomplish the restorage operation.

Accordingly, it is another object of the present invention to provide a magnetic memory system which is capable of producing the strong destructive readout signal and in which the re-storage of the information is accomplished in a minimum time and with a minimum of equipment.

In achieving the above objects of the invention, it has been discovered in accordance with the present invention that it is possible to store information in a magnetic storage element which constitutes an apertured portion of a magnetic strip by passing an alternating current sequence of progressively decreasing amplitude through the strip itself with the concurrent presence of a direct current in a winding which links the storage element portion of the magnetic strip. The magnitude of the direct current in the winding is limited such that it is substantially incapable of changing the remanent state of magnetic flux in the storage element in the absence of the alternating current sequence within the strip itself, and yet the polarity of the winding current is the sole determinant of the polarity of the remanent magnetic flux.

In carrying out the invention in one preferred form thereof, a perforated magnetic strip is provided with a source of alternating current sequences in which each succeeding half cycle is of decreasing amplitude to provide current through the strip and to thereby induce fields therein. A winding is positioned within a perforation to create a magnetic field in the adjacent storage element portions of the strip, the field having components orthogonal to the fields created by the alternating current sequence. A direct current source is connected to provide a current to the winding having a polarity dependent upon the binary digit value to be stored. The storage element portion of the strip is operable to achieve a remanent magnetic stable state indicative of a binary digit in response to the application of a direct current to the winding during at least an alternating portion of the sequence of alternating current.

Other features, objects and advantages of the invention will be apparent from the following description and the accompanying drawings which are briefly described as follows:

FIG. 1 is a schematic diagram illustrating a strip memory together with apparatus associated with one storage element thereof.

FIGS. 2*a*, 2*b* and 2*c* are graphical representations of various electrical signal conditions to be found in the operation of the apparatus of FIG. 1.

Figure 5:
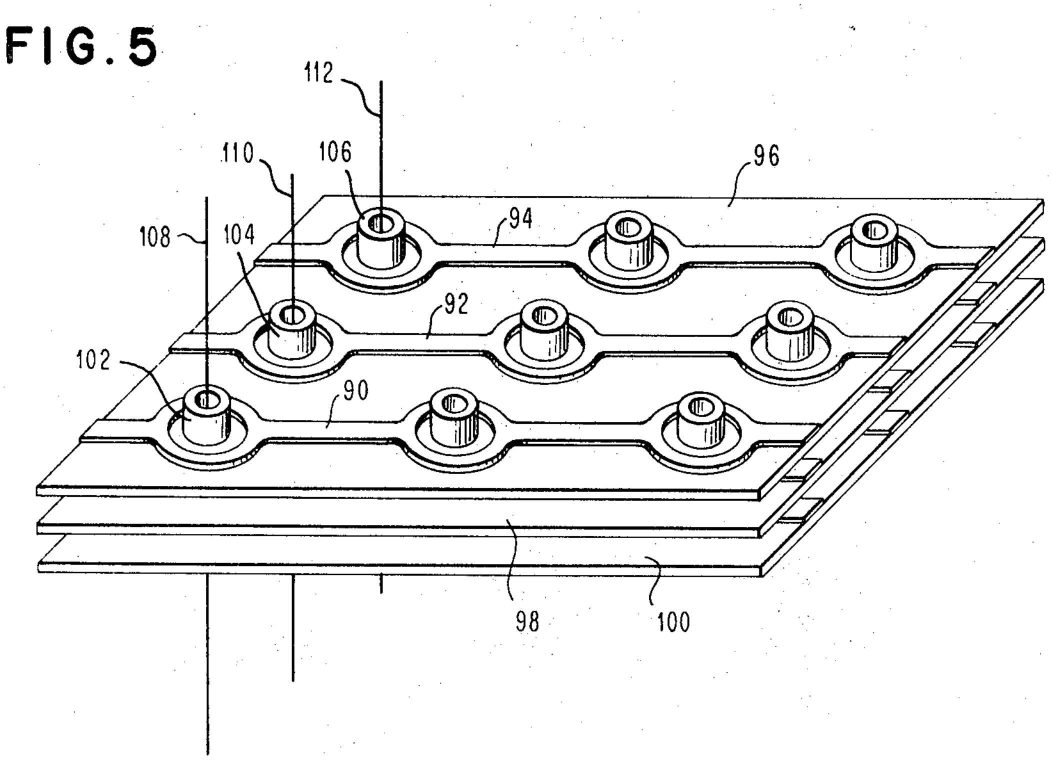
FIG. 5 is a perspective view illustrating a physical embodiment of an assembly of the strip memory elements of the present invention.
Figure 6:
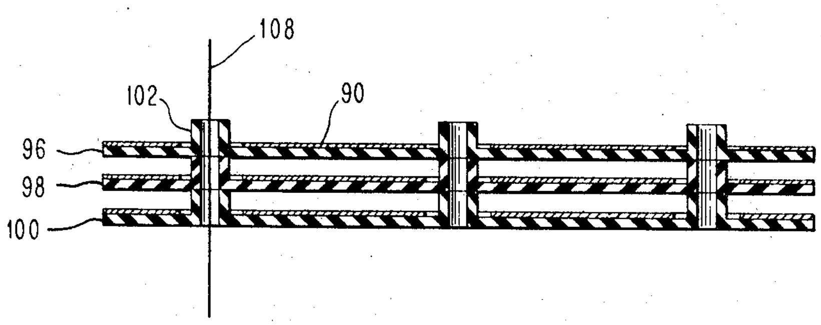

And FIG. 6 is a sectional view of the physical embodiment shown in FIG. 5.

Figure 1:
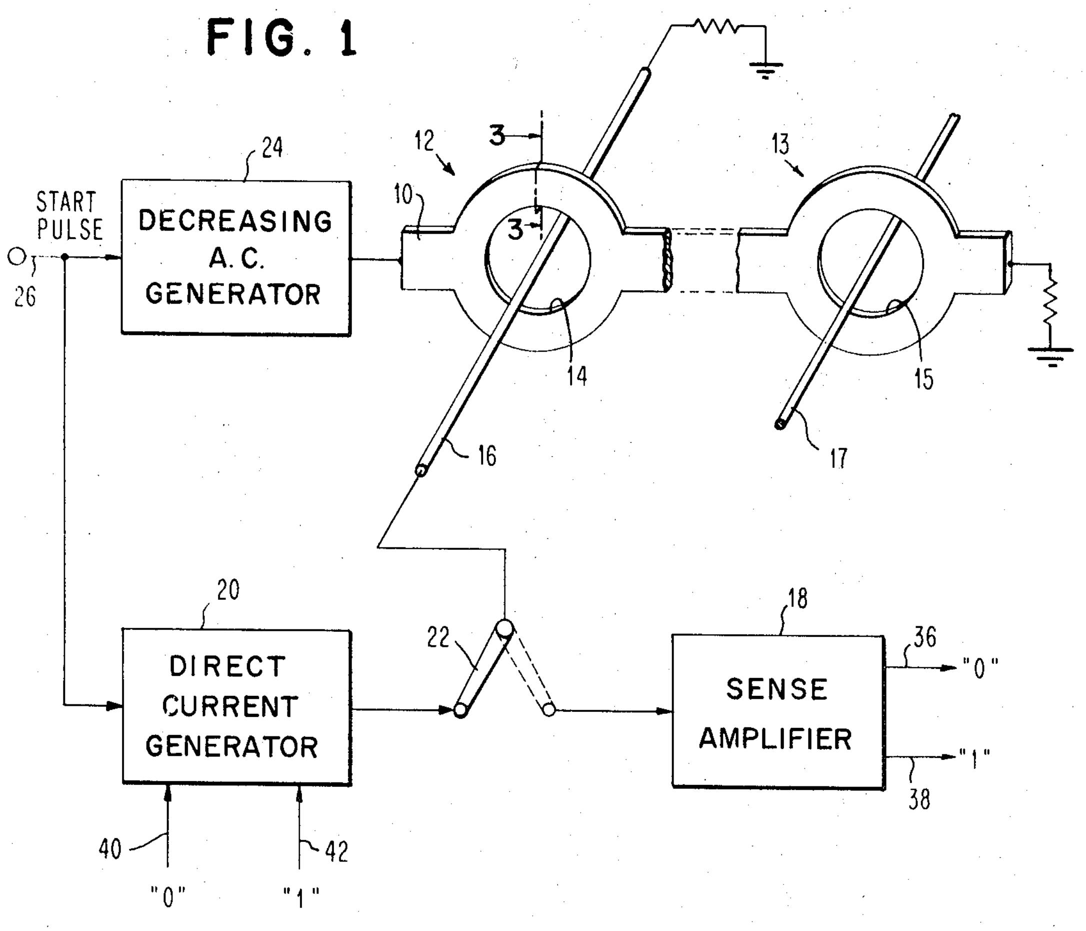

Referring more particularly to FIG. 1, there is shown a magnetic strip member 10 having perforated portions 12 and 13 with perforations or apertures at 14 and 15 to form memory elements. This invention contemplates many such memory elements within each strip. However, for simplicity and clarity, only two elements are shown, and the associated apparatus is shown and described for only one element with the understanding that similar apparatus is to be provided for the others. Single windings 16 and 17 are threaded through the perforations 14 and 15. A sense amplifier 18 and a direct current generator 20 are provided and arranged for alternative connection to the winding 16 through a single pole double throw switch 22. An AC generator 24 which is capable of generating sequences of alternating current waves of decreasing amplitude is connected to provide such alternating current to strip 10. The generators 20 and 24 may be started concurrently by the same start pulse source, as indicated by the input connection 26.

It has been discovered that when a decreasing alternating current sequence is applied to the strip 10 in the presence of a direct current excitation in the winding 16, such as may be provided by the direct current generator 20 that the storage element portion 12 of the strip 10 will change its residual magnetic state dependent upon the polarity of the direct current in the winding 16. This direct current is of a low magnitude such as would be incapable of changing the magnetic state of the strip storage element in the absence of the alternating current waves in the strip itself.

To read out the information stored in element 12, the switch 22 is moved to the right, as indicated in phantom, to connect the winding 16 to the sense amplifier 18. The AC generator 24 is then again activated to provide current within the strip 10. As a result, an output pulse appears at the sense amplifier 18 from the winding 16 during the period of the first half cycle of the alternating current from the generator 24, and the polarity of this output signal is indicative of the information stored by the remanent magnetic flux state of the storage element 12. Even though the AC wave from generator 24 persists for a number of half cycles, the read output pulse appearing at the sense amplifier 18 occurs only during the first half cycle, and there is very little, if any, output to be sensed by the amplifier 18 after that first half cycle. Accordingly, the sense amplifier 18 may be arranged to respond only to signal levels above a certain minimum signal level in order to distinguish a legitimate readout pulse from other smaller disturbances appearing on the winding 16 in order to discriminate a true readout signal from such "noise" signals. It is also possible to arrange the sense amplifier 18 so that it is operable only in response to the start pulse appearing at input connection 26 and so that its period of operation persists only for a period sufficient to detect the output signal occurring during the first half cycle of the alternating current. Thus, two simple methods of discrimination are available.

Figure 2A:
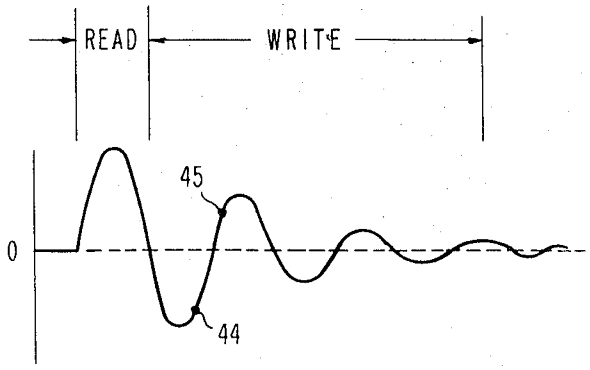

FIG. 2*a* represents an idealized decreasing AC wave such as may be provided to the magnetic strip 10 from the AC generator 24.

Figure 2B:
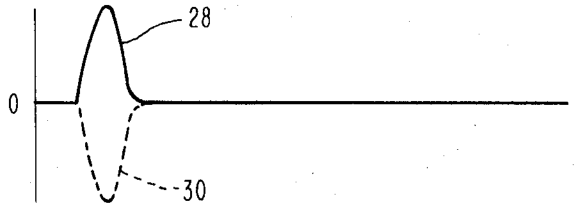

FIG. 2*b* is an idealized curve illustrating the read output signal, as indicated at 28. The output signal curve 28 represents one magnetic remanent state of the magnetic element which may be assigned the binary value "zero." An opposite polarity output signal, such as indicated at 30, will be obtained for the opposite remanent magnetic state of the storage element, and may be assigned the binary value "one."

As explained above, information may be written into the storage element by the application of an alternating magnetic agitation by means of the alternating current in strip 10 with the concurrence of a direct current in the winding 16 such as may be supplied from direct current generator 20. Since the read out signal, as shown in FIG. 2*b*, is available only during the first half cycle of the alternating current on the strip 10, it is possible to use the remaining portion of the alternating current sequence to write information into the storage element 12 by the application of a direct current to winding 16 during that period.

Figure 2C:
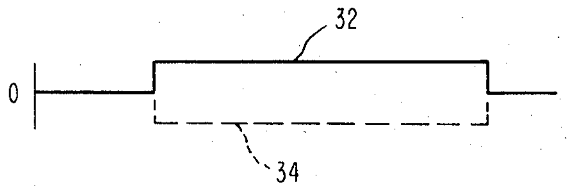

FIG. 2*c* represents an idealized waveform of the direct current such as may be available from direct current generator 20. This is represented as a square wave pulse 32 which will operate in conjunction with the alternating current wave from generator 24 to cause a residual magnetic state in the element 12 which is said to represent the storage of a binary "zero." If the polarity is reversed as shown by the dotted waveform 34, then the result is the opposite magnetic remanent state indicating a binary "one."

The idealized waveforms of FIGS. 2*a*, 2*b* and 2*c* are in alignment with one another so as to indicate a preferred relative timing relationship. The output pulse 28 of FIG. 2*b* is, of course, very definitely related to the time of the first half cycle of the alternating current wave of FIG. 2*a* as explained above. The direct current writing signal supplied from generator 20 to the winding 16 need not necessarily have the timing relationship shown by the curve 32 of FIG. 2*c* with respect to the alternating current in the strip 10. Furthermore, the direct current need not be in the form of an elongated pulse, but may be instead a rather prolonged direct current input so long as it persists or exists during an alternating portion of the decreasing alternating current within the strip 10. However, since the first alternating current half cycle provides a read out signal, it is quite convenient to use the remaining portions of the same alternating current sequence for the purpose of writing information into the storage element. This may constitute a re-writing or re-storage of the information which was destructively read out to the sense amplifier 18, or it may constitute the storage of new information. Accordingly, it is desirable to have the direct current generator input applied after the first half cycle, and continuing through the period of the remaining effective half cycles of the sequence of alternating current.

Therefore, it is apparent that the system of FIG. 1 is capable of a separate read operation or a separate write operation, or a combined operation to read the information stored in the element 12 during the first half cycle of the alternating current sequence as indicated by FIG. 2*b*, and then to store information in the element 12 during the remainder of the alternating current sequence shown in FIG. 2*a* by the application of the DC signal 32 shown in FIG. 2*c*. This last mentioned combined operation implies a very fast and precise operation of the switch 22 which is schematically illustrated in FIG. 1 as a manual switch. It will be understood, of course, that electronic switching arrangements are easily made to accomplish this function. One simple solution of this problem is to connect both the generator 20 and the sense amplifier 18 to the winding 16, and then to provide arrangements for de-sensitizing the sense amplifier 18 during all periods other than the first half cycle of each alternating current sequence. This function can be accomplished through known circuitry and would simply involve connecting the start pulse from the connection 26 to the sense amplifier 18 for clocking purposes. It is also understood, of course, that the direct current generator 20 may preferably have a built-in delay such that the beginning of its output will be delayed after the start pulse input is received for a period equal to the first half cycle of the alternating current. Thus there is no overlap in the operation of generator 20 and amplifier 18.

The sense amplifier output signals are available at output connections 36 and 38 to indicate the binary information read out. The operation of the direct current generator 20 may be controlled to provide different polarity outputs for the storage of different binary information by the input connections 40 and 42 which may be respectively energized to indicate that either a zero or a one is to be stored. If the same information which is read out is to be re-stored, then the output connections 36 and 38 of the sense amplifier 18 may be connected respectively to the input connections 40 and 42 of the direct current generator 20. The sense amplifier output connections are also connected to other utilization apparatus, of course.

Figure 4:
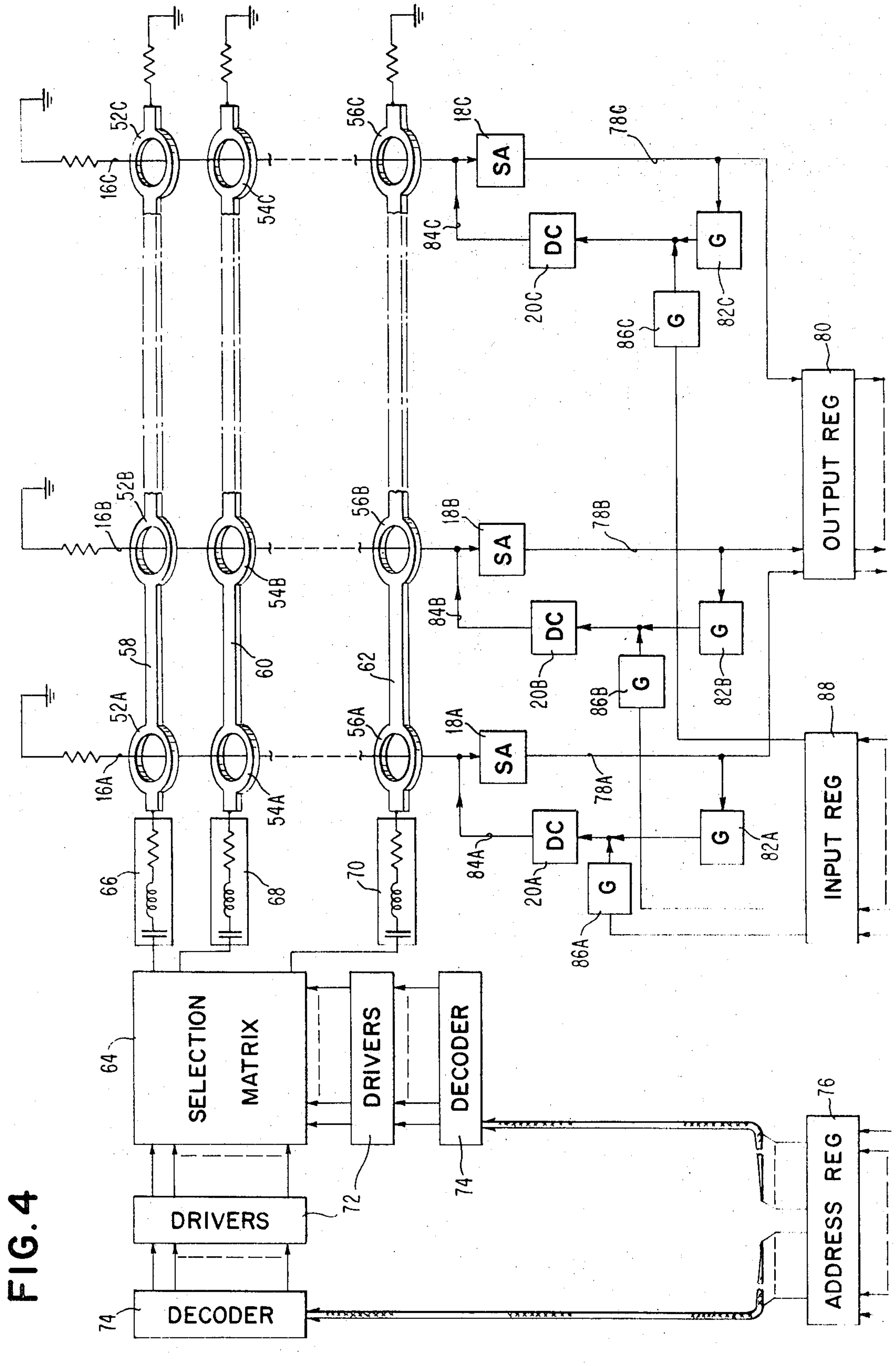
FIG. 4 is a schematic diagram of a storage system in accordance with the present invention and incorporating the strip memory elements as illustrated in FIG. 1.

FIG. 4 shows a system in accordance with the present invention which employs the combined reading and writing cycles described above in a plurality of strips each incorporating a plurality of storage elements. This system will be described more fully below.

The idealized waveforms of FIGS. 2*a*, 2*b* and 2*c* are not drawn to comparable scales. For instance, it is generally intended that the alternating current amplitude of FIG. 2*a* shall be proportionately much greater than the output current of the direct current generator as shown at 32 in FIG. 2*c*. For instance, the peak value of the first half cycle of the alternating current sequence may be in the order of thirty-five times the value of the direct current from generator 20. Furthermore, in terms of effective magnetomotive forces within the magnetic material of the strip 10 and the element 12, the magnitude of the alternating magnetomotive force due to the alternating current sequence may be in the order of one hundred times the magnetomotive force due to the direct current from generator 20. As previously emphasized, the direct current excitation due to the DC generator 20 available in the winding 16 is much less than the direct current which would be required to establish or change a remanent magnetic flux state of the element 12 if unaccompanied by the alternating current sequence. The reasons for the effectiveness of the combination of this weak unidirectional magnetomotive force in combination with the relatively strong alternating current wave sequence magnetomotive force created by current within the magnetic material itself is not fully understood. However, experimental observations indicate that actual changes in the residual magnetic state of portions of the element 12 occur during the periods in the alternating current wave sequence beginning just before a zero crossover portion of the alternating current, and ending just after a zero crossover portion. Such a period is indicated, for instance, between the points of 44 and 45 on the curve of FIG. 2*a*. Such a zero crossover period, to be effective, must occur during the existence of a direct current signal in the winding 16 from generator 20. A single crossover period, such as the period illustrated by the distance between the points 44 and 45 is sufficient in conjunction with the direct current excitation to establish appreciable residual magnetic flux storage. Depending upon the materials and geometrical configuration of the element, full storage as evidenced by substantially complete magnetic polarization of the material is possible in such a single period. However, if insufficient magnetic polarization is achieved in one such period, a longer portion of the alternating current sequence should be available which will include more than one zero crossover period. This is true because it has been discovered that there is a cumulative effect in establishing a more complete change of residual magnetic flux state in response to each additional effective zero crossover. It must be emphasized that the direction or polarity of change in the alternating current during the zero crossover period is immaterial. Thus, a zero crossover in either direction is effective and and the alternating current sequence may commence with a half cycle of either polarity.

While not previously mentioned, the polarity of the output signal, as indicated by FIG. 2*b*, is independent of the polarity of the first half cycle of the alternating current wave sequence. This observation is related to the fact that at any individual point within the magnetic storage element 12, the magnetomotive forces due to the AC current within the material of element 12 are orthogonal to the information storing residual magnetic flux. An orthogonal relationship is also believed to be important in the writing operation in accordance with the present invention in which a relatively weak unidirectional magnetic field is combined with an orthogonally related alternating magnetic field of much greater amplitude. Perhaps it is more accurately stated that at least an appreciable component (the effective component) of the unidirectional, magnetic field is orthogonal to the alternating magnetic field. Furthermore, it has been observed to be important in the operation of the present invention that any current path within the storage element 12 which is aligned in a direction perpendicular to both magnetic fields should be a path of at least restricted conductance. This will be elaborated upon more fully below.

As mentioned above, the storage of information in accordance with the present invention occurs during zero crossover periods of the alternating current and if a number of cycles of zero crossovers are available, and if full magnetic polarization is not effective in one cycle, a cumulative or additive effect is evident such that the residual magnetic storage within the magnetic storage element is rendered more complete by each additional alternating current cycle of the alternating current sequence. This is believed to be due to the fact that additional magnetic material within the magnetic strip achieves a polarized residual magnetic state indicative of the information stored on each additional cycle. Because of this cumulative or additive effect in the storage of information, a very high magnetic efficiency is achieved such that substantially the entire magnetic storage capacity of the material is utilized. It has been found for instance that with a two and one half cycle alternating current sequence for the storage period, approximately ninety percent of the magnetic material achieves a polarized residual magnetic flux condition. The progressive or cumulative magnetic storage is believed to occur at successive layers or strata within the magnetic material of the strip.

Figure 3:
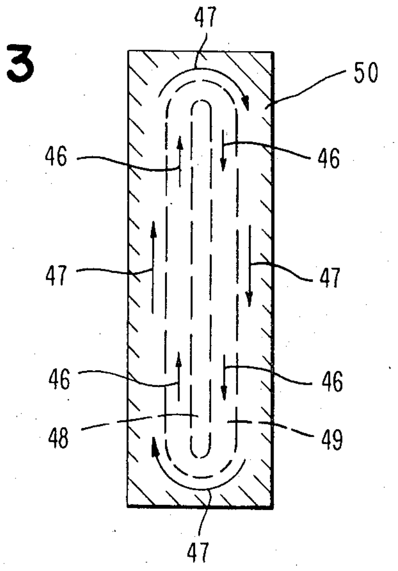
FIG. 3 is an idealized cross-sectional view of a memory element portion of the strip of FIG. 1 taken along section lines 3—3 and indicating certain paths of magnetic flux therein due to an instantaneous value of the alternating current in the strip.

FIG. 3 is a sectional view taken at section 3—3 through the storage element portion of strip 10 in FIG. 1. The arrows 46 and 47 shown in this sectional view indicate the fields within the strip material at a particular instant due to the alternating current within the material itself. For the purposes of this explanation, this cross-section of the strip is arbitrarily indicated as divided into a central portion 48, an inner stratum 49, and an outer stratum 50. The arrows 46 indicate the field within the inner stratum 49, and the arrows 47 indicate the field in the outer stratum 50. Since these fields are due to the current which is carried by the magnetic strip itself, the central portion 46 has substantially no field applied to it due to the alternating current. The effective unidirectional field due to the current in the winding 16 is always in a direction substantially orthogonal to the fields indicated by the arrows in FIG. 3, that is, it would be directed either into or out of the plane of the sectional view of FIG. 3, and perpendicular thereto. These orthrogonal unidirectional fields are not indicated in any way in FIG. 3.

Since the alternating current is distributed through the various strata and the central portion 48 of the material of FIG. 3, it is quite apparent to those familiar with electro-magnetic theory that, not only will there be virtually no magnetomotive force within the central portion 48, but the field indicated by arrows 47 in the outer stratum 50 will be stronger than the field indicated by arrows 46 within the inner stratum 49 for a given alternating current amplitude. This may be explained in a qualitative manner by the statement that the magnetomotive force at any stratum is determined by the amount of current carried by the material within all portions interior thereto. In those cases where cumulative storage in a plurality of half cycles is employed, it appears that the magnetomotive forces in the outer stratum 50 are so strong in relation to the orthogonally related unidirectional magnetomotive forces in the early cycles of the alternating current sequence, that no unidirectional residual magnetic status may be obtained. Accordingly, it is believed that on the earlier higher amplitude cycles of the alternating current sequence, storage occurs only in the innermost strata such as stratum 49. As the alternating current decreases in amplitude, the outer strata such as 50 achieve the unidirectional residual flux state. In this manner, it appears that successive zero crossovers cause a unidirectional residual flux storage at successive strata working from the inner strata such as 49 to the outer strata such a 50. While only a single inner stratum 49, and a single outer stratum 50 are shown in the sectional view of FIG. 3, it is quite apparent that many more strata may be involved depending upon the thickness of the material, and the number of effective half cycles in the alternating current sequence.

One observation that appears to be somewhat inconsistent with the strata theory just explained is that a sequence of alternating current cycles of substantially uniform amplitude may be employed to accomplish the unidirectional residual flux status in conjunction with the direct current within the winding. However, a very large number of cycles of uniform amplitude alternating current are necessary for this purpose and it appears that the lack of efficiency may be due to the fact that later alternating current cycles cause a partial de-magnetization from the partial unidirectional residual magnetic flux status established by a previous half cycle. By contrast, however, a substantially total residual magnetic flux status is achieved within the material quite rapidly in the presence of a decreasing amplitude alternating current sequence. Accordingly, the decreasing amplitude alternating current sequence is much to be preferred whenever repeated storage cycles are necessary.

It was explained above in connection with FIG. 1 that in order to write information into the storage element 12, it is necessary to have the concurrent presence of the direct current in the winding 16 and at least a portion of the alternating current within the strip 10 from the generator 24. This requirement of concurrence of the two inputs immediately suggests that a degree of selection may be possible with this single winding magnetic memory element in a system employing many such elements.

FIG. 4 illustrates a memory system employing a plurality of multi-element strips arranged to form a two-dimensional array of storage elements. These elements are shown in FIG. 4 at 52A, B and C, 54A, B and C and 56A, B and C. Elements 52A, B and C are formed in a common magnetic strip 58, elements 54A, B and C are formed in a common magnetic strip 60, and elements 56A, B and C are formed in a common magnetic strip 62. A common winding 16A is provided for all of the elements 52A, 54A and 56A. Similarly, a common winding 16B is provided for the elements 52B, 54B and 56B, and a common winding 16C is provided for the elements 52C, 54C and 56C. While only three magnetic strips forming three rows, and three columns are shown in the schematic system of FIG. 4, it is understood that this system may be expanded to any desired size by adding more strips between strips 60 and 62, and by lengthening the strips to form additional columns between the column served by winding 16B and the column served by winding 16C. A decreasing alternating current sequence may be selectively applied to any one of the strips 58, 60 or 62 by means of a selection matrix 64 which is connected to the strips through suitable reactive networks 66, 68 and 70. The reactive networks 66, 68 and 70 are selected and designed to provide a decreasing alternating current wave sequence in response to a pulse input from the selection matrix 64. This decreasing alternating current sequence may be essentially a damped sinusoidal current, and the networks 66, 68 and 70 may therefore each include a capacitor, an inductance matched to the capacitor to cause resonance at a desired frequency, and a suitable resistance which is sufficient to cause the desired amount of damping. It will be understood that other decreasing alternating current sequence generating networks and devices may be employed in the systems in accordance with this invention, and this feature will not be elaborated further here since it is within the skill of the art to provide numerous variations. The important feature in this connection in the system of FIG. 4 is that the selection matrix 64 controls the initiation of each alternating current sequence. This control is exercised in response to associated drivers 72 and decoders 74 in response to information which may be stored in an address register 76.

Whenever a decreasing alternating current is applied to one of the strips 58, 60 or 62, a readout signal is obtained on each of the windings 16A, 16B and 16C indicative of the information stored within the storage elements included within that strip. Unless information is also stored during the same alternating current sequence, the information stored within the individual storage elements of the strip is substantially destroyed. While the individual storage elements may not be completely de-magnetized, the residual magnetic flux is reduced to such an extent that a reliable second readout signal is not available. Accordingly, the information previously stored may be re-stored, or new information may be stored within the strip containing the alternating current sequence. Because of the fact that all of the elements of an individual strip may be read out in parallel by a single alternating current sequence, and re-stored, or written into, in a single sequence, it is desirable to have the elements of a single strip handle groups of digits or bits of information which are conventionally referred to as "words."

The information read out of the elements of a storage strip and detected as pulses on the windings 16A, 16B and 16C is amplified by sense amplifiers 18A, 18B and 18C, and the resultant information, as amplified, may be carried through connections 78A, B and C to a suitable output register 80. If the same information is to be re-stored, it is directed through schematically indicated gates 82A, B and C to the direct current generators 20A, B and C, and thus through connections 84A, B and C back to the windings 16A, B and C. The DC generators 20A, B and C operate as previously explained for generator 20 of FIG. 1 to provide a direct current in the associated winding having a polarity determined by the information to be stored and which exists concurrently with at least an alternating portion of a suitable alternating current sequence in the word strip which is active.

If a new word is to be stored in the active word strip, then the new word information is supplied to the DC generators 20A, B and C through gates 86A, B and C from an input register 88. It will be understood, of course, that either the 86 gates are active for the storage of new information, or the 82 gates are active for the re-storage of information, but that both sets of gates are never active at the same time. It will be understood also that each of the gating devices must be provided with control inputs. These, and other details, have been omitted from this schematic diagram of FIG. 4 in order to promote the simplicity and clarity of the drawing.

It is clear from the above explanations of the operation of this invention that the magnetic strip in which the storage elements are formed must be electrically conductive as well as having suitable magnetic properties. One material which has been found to be suitable for this purpose for the construction of the strip 10 of FIG. 1 or the strips 58, 60 and 62 of FIG. 4, is an alloy of nickel and iron. A particular alloy which is useful is described as Hy Mu 80 (79% Ni, 17% Fe, 4% Mo). In one embodiment this material was fabricated in the form of a thin strip having a thickness of 0.0005 inch and in which the perforated portion had an outside diameter of 0.25 inch, and an inside diameter of 0.15 inch. The width of the unperforated portion of the strip was 0.1 inch. With this configuration, and with an initial peak amplitude alternating current value of about 3.4 amperes in the strip 10 of FIG. 1, a readout signal was obtained on the winding 16 having a peak amplitude of about eighty millivolts. Satisfactory storage was obtained in approximately two and one half cycles of the decreasing alternating current with a DC current on the winding 16 of approximately one hundred twenty milliamperes. The reading time for the first alternating current half cycle was approximately two tenths microsecond, and the writing time was approximately three microseconds. It will be understood, of course, that these operating values will vary widely depending upon the materials used in the strip and upon the size and geometrical configuration of the strip and storage elements. In particular, it is known to be possible to reduce the size of the planar dimensions of the storage element portion of the strip to something in the order of one twentieth of the dimensions just given, with the other elements being proportionately reduced in size. This reduction is facilitated by the fact that only a single winding is necessary so that a very minimum of space is required to thread the winding through the perforation at the storage element portion of the strip.

The thickness of the magnetic strip may vary from the magnetic thin film range in the order of 4000 angstroms up to a thickness of approximately 0.010 inch. Referring back to the strata theory explained in connection with FIG. 3, with the thinnest materials, a single alternating current zero cross-over period may be sufficient to accomplish complete storage, but the thicker materials often require a number of effective alternating current cycles with the cumulative magnetic residual flux storage effect to accomplish complete magnetic polarization. It is preferred that there should be restricted conductivity within the magnetic strip in directions perpendicular to the alternating current path in order to minimize eddy current damping effects. This is accomplished quite effectively by fabricating the magnetic strip from thin material. This is also desirable because it holds the physical dimensions of the entire structure within a compact range. This is important in a multiple strip arrangement such as illustrated in the physical embodiments of FIGS. 5 and 6.

FIG. 5 is a perspective view illustrating one physical embodiment of the magnetic storage strips of the present invention arranged together to form a system. The thin magnetic conductive strips 90, 92 and 94 are supported by a plate of insulating material 96. The plate 96 may be assembled with similar insulating plates 98, and 100 which also support individual magnetic strips such as 90, 92 and 94. The insulating plates 96, 98 and 100 may be formed from any suitable insulating material. However, if the magnetic strips require annealing after fabrication of the structures, then the plates 96, 98 and 100 must be formed from a high temperature insulating material such as a ceramic. Where a particularly high speed of operation is required, the plates 96, 98 and 100 may be formed from a conductive metal plate which is then coated with a ceramic insulation, the coated metal plate thus acting as a ground plane and reducing the impedance of the transmission lines formed thereby.

The insulating plates 96, 98 and 100 preferably include integrally formed hubs such as 102, 104 and 106 which protrude from the surface of the insulating plate at the memory element portions of the individual strips. These hubs each contain a central opening through which the windings 108, 110 and 112 may be threaded. The hubs serve as spacers to maintain the stacked plates 96, 98 and 100 at desired spaced positions.

FIG. 6 is a sectional view of the structure shown in FIG. 5 and it illustrates how the hubs on the lower plates serve as spacers to support the upper plates while at the same time forming an unbroken passage for threading the windings, such as 108, through the plates and thus through the storage element portions of the strip.

While FIGS. 5 and 6 illustrate only three by three assembly of strips including a total of only twenty-seven storage elements, it is quite apparent that the size and number of the plates can be increased to include any desired number of strips and memory elements.

Referring back to FIG. 3 and the accompanying explanation of the magnetic behavior of the material within the magnetic strip, it will be recalled that there is virtually no magnetic field due to the alternating current within the central portion 48 of the strip. Accordingly, it is unnecessary for that central portion of the strip to be composed of a magnetic material. Therefore, a material which is chosen for better electrical conductivity rather than magnetic properties may be employed in that central section. Thus, a highly conductive material such as copper or aluminum may be employed in the central section of the strip if surrounded with a layer of magnetic material. Furthermore, since it is the magnetic material itself which must have a restricted conductance in directions perpendicular to the alternating current flow, the central conductive portion of the strip need not be formed as a thin flat member, but may be a member which has a substantially square or circular cross section with a thin layer of magnetic material surrounding it. Accordingly, the term "magnetic strip," as used in the present application, is not restricted to thin flat configurations, but the term "strip" instead is given its broader meaning to indicate an elongated structure. Furthermore, the term "magnetic strip" is also intended to encompass the composite material structures including a non-magnetic conductive central portion with a magnetic layer on the outside. The requirement of restricted conductance of the magnetic material also suggests that with a central portion of highly conductive material, the outer magnetic material need not be conductive at all. Thus, the outer portions may be composed of a non-conductive magnetic material such as a ferrite. This alternative too is intended to be encompassed within the term "magnetic strip" as used in the present application. With a structure incorporating a non-conductive material, there is no longer any reason connected with magnetic material conductance for restricting the thickness of the magnetic material within the strip. However, it is desirable to restrict the physical dimensions simply for reasons of economy of space.

The present invention generally contemplates destructive reading and immediate re-storage of the information read out, or storage of new information. However, it will be obvious that if a small read out signal is sufficient in amplitude, the information which is stored in accordance with the teachings of the present invention may be non-destructively read out.

The magnetic strip members of the present invention may be composed of a single material, or they may be composite members as described in more detail above. However, the magnetic portions of the magnetic strips may be composed of almost any material which is capable of achieving and maintaining a polarized remanent magnetic state.

One of the interesting features of this invention is that a single magnetic strip member provides storage for an entire word of information which may have many binary digits. This is in contrast to the usual magnetic storage arrangements in which individual magnetic structures are capable of storing only a single digit. Furthermore, only one single turn winding is sufficient, with the current in the magnetic strip, to accomplish both readout and storage functions.

The frequency and the wave shape of the alternating sequence current applied to the magnetic strip may vary widely. The lower frequency limit is generally determined only by the requirement of reasonable speed in the operation of the device. The upper frequency limit is determined by various factors such as eddy current damping effects, domain wall velocity limitations, the geometry of the structure, the thickness of the magnetic member and various other factors. In general, it can be said that the operation of the magnetic memories in accordance with this invention is quite rapid and the structure is capable of operation at the frequencies in the order of one megacycle.

The feature of this invention in which there is a cumulative storage of information through repeated alternating current zero crossover periods is particularly valuable. It should be emphasized that the use of additional zero crossovers does not necessarily reduce the speed with which storage is accomplished. This is true because it is sometimes possible to increase the frequency to obtain additional zero crossover storage periods in the same operating time. Furthermore, the degree of total magnetization achieved is generally higher with the higher frequency storage sequence having more cycles than with the lower frequency operation with fewer cycles.

In the explanation of the combined reading and writing operation in connection with FIGS. 2*a*, 2*b* and 2*c*, it was suggested that the first half cycle of the alternating current sequence should be devoted to the reading operation, and subsequent half cycles devoted to the writing operation. However, it should be pointed out that the readout signal 28 as shown in FIG. 2*b* does not persist for the entire first half cycle of the alternating current sequence. Therefore, it is possible with precise system controls to commence the writing cycle before the end of the first alternating current half cycle and to thereby utilize the first zero crossover period of the alternating current for writing. In this way, a more rapid writing operation is possible.

While not previously emphasized, it is preferable in the fabrication of the magnetic strip to provide a greater width in the strip in the vicinity of each perforation so that the widths of the two portions of the strip which surround the perforation are substantially uniform and equal. Structures similar to this, incorporating a perforated magnetic strip and windings within the perforations form a portion of the subject matter described and claimed in a prior co-pending patent application, Ser. No. 224,415, filed by James C. Sagnis, Jr., Michael Teig, and Robert L. Ward on Sept. 18, 1962 for an invention entitled "Non-Destructive Readout Magnetic Memory," and assigned to the same assignee as the present invention.

While the invention has been particularly shown and described with reference to preferred embodiments thereof, it will be understood by those skilled in the art that various changes in form and details may be made therein without departing from the spirit and scope of the invention.

What is claimed is:

1. A magnetic memory comprising
a conductive magnetic strip having at least one perforation therein and forming a memory element at said perforation,
a source of a decreasing alternating current sequence connected to said strip,
a conductor positioned within said perforation,
and a source of direct current connected to said conductor and operable solely upon the concurrence of at least an alternating portion of said alternating current sequence to establish a polarized remanent magnetic flux state within said memory element.

2. A magnetic memory comprising
a conductive magnetic strip having perforations therein and forming a memory element at each perforation,
a source of a decreasing alternating current sequence arranged for connection to said strip,
a conductor positioned within each said perforation,
and a separate source of direct current arranged for connection to each of said conductors and operable solely upon the concurrence of at least an alternating portion of said alternating current sequence to establish a remanent magnetic flux state within the associated memory element,
said remanent flux having a polarity determined solely by the polarity of said direct current.

3. A magnetic memory comprising
a conductive magnetic strip,
a source of alternating current sequences connected to said strip, each alternating current sequence from said source being of progressively decreasing amplitude,
said strip including performations forming memory element portions,
a winding positioned within each perforation, and apparatus including a source of direct current connected to said winding for supplying thereto a direct current having an amplitude which is insufficient to establish a polarized remanent magnetic flux state in the asociated memory element,
said apparatus being operable to establish a polarized remanent magnetic flux state within said element upon the concurrence of said direct current with at least an alternating portion of one of said alternating current sequences,
the direction of said remanent magnetic flux polarity being solely determined by the direction of said direct current.

4. A magnetic memory comprising
a magnetic strip,
a source of alternating current sequences in which each succeeding half cycle is of decreasing amplitude,
said source being connected to provide current through said strip and to thereby induce magnetic fields therein, said strip including a perforation therein,
a single turn winding positioned within said perforation which is oriented and operable when conducting a current to create a magnetic field in the adjacent portions of said strip which has components orthogonal to the fields created by said alternating current sequences,
and a direct current source connected to provide a current to said winding having a polarity dependent upon a binary digit value to be stored,
said strip being operable to achieve a remanent magnetic stable state indicative of a binary digit in response to the application of one damped alternating current sequence to said strip with the concurrent presence of a direct current in said winding during at least an alternating portion of said sequence.

5. A magnetic memory comprising
at least one conductive magnetic strip, said strip having a plurality of memory element portions,
each of said memory element portions having a perforation therein,
a single conductor positioned within each perforation,
a source of direct current arranged for connection to each of said conductors, and a source of decreasing alternating current sequences connected to provide a current within said strip,
the initial amplitude of said alternating current being substantially greater than the amplitude of said direct current,
the direct current in each of said conductors being operable solely upon the concurrence therewith of a plurality of zero crossover portions of said alternating current sequence to establish a remanent magnetic flux state within the associated memory element having a polarity determined solely by the direction of said direct current,
said polarized magnetic flux state being established in a cumulative fashion during successive zero crossover periods of said alternating current which concur with the presence of said direct current.

6. A magnetic memory comprising
a magnetic strip having a plurality of perforations therein each forming a memory element,
means for subjecting said strip to an alternating magnetic agitation comprising a source of alternating current sequences,
each sequence comprising a plurality of half cycles of decreasing amplitude,
said current source being connected to supply said current to said strip to thereby induce alternating magnetic agitation fields therein,
said strip being constructed to have restricted conductance in directions perpendicular to the direction of said alternating current,
each perforated portion of said strip having a winding threaded through the perforation thereof and oriented to be operable when conducting a current to create a magnetic field therein which is orthogonal to the fields created by said alternating current sequences.
and apparatus including a direct current source connected to provide a current to said winding which is insufficient when applied alone to change the remanent magnetic stable state of the associated memory element portion of said strip, said apparatus being operable to change the remanent magnetic stable state of said memory element upon the concurrence of at least an alternating portion of said alternating sequence with said winding current.

7. A magnetic memory comprising
a conductive magnetic strip having perforations therein forming a memory element at each perforation,
a decreasing alternating current sequence source connected to said strip to provide current therein,
a conductor positioned within each perforation,
said strip being operable in response to the first half cycle of said alternating current to induce a readout signal in the conductors of each of said perforations indicative of individual polarized remanent magnetic flux states in the memory element portions thereof,
and a separate source of direct current arranged for connection to each of said conductors and operable solely upon the concurrence of at least an alternating portion of said alternating current sequences following the period of said readout signal to establish a remanent magnetic flux state within the associated element,
said remanent magnetic flux state having a polarity determined solely by the polarity of said direct current.

8. A two-dimensional memory system comprising a plurality of conductive magnetic strips each having spaced perforations therein and forming a memory element at each perforation,
a decreasing amplitude alternating current sequence source arranged for connection to each of said strips,
a single conductor threaded through all of the corresponding perforations in all of said strips,
and a source of direct current connected to each of said conductors and operable to establish a polarized remanent magnetic flux state within any associated memory element upon the concurrence of at least an alternating portion of said alternating current sequence within the strip including said element,
said direct current being of insufficient amplitude to establish a polarized remanent magnetic flux state in any associated memory element in the absence of said alternating current sequence in the strip containing that element.

9. A memory system comprising
a conductive magnetic strip for the storage of each word of information,
each of said strips having spaced perforations therein to thereby form a memory element for a digit of information at each perforation,
means for selecting a particular word storage strip for access thereto,
said selection means including a decreasing amplitude alternating current sequence source,
said alternating current source being operable under the control of said selection means to apply said alternating current sequence to the magnetic word storage strip selected for access,
a single conductor threaded through the perforations of all of the corresponding storage elements of all of said magnetic strips,
means connected to each of said conductors for sensing a readout signal from the active strip selected by said selection means during the first half cycle of said alternating current sequence,
means operable during subsequent portions of said alternating current sequence to store information in the memory elements of sadi active magnetic strip,
said last named means including a source of direct current arranged for connection to each polarity dependent upon the individual binary digit to be stored,
said conductors being operable when carrying said direct current only with the concurrence of said alternating current sequence in said active magnetic strip to establish a polarized remanent magnetic flux state indicative of the binary digit to be stored,
information input means connected to control said direct current source to store new information,
and means for disconnecting said input means and for connecting said sensing means to said direct current source for operation thereof to re-store during a particular alternating current sequence the same information which was read out during the first half cycle of said sequence.

10. A magnetic memory comprising:
(a) a uniting conductive and magnetizable strip having at least one aperture therein,
(b) a conductor positioned within said aperture,
(c) means for selectively passing current through said conductor for producing a first magnetic field in said strip which is so oriented as to establish a remanent magnetization in said strip around said aperture in a selected clockwise or counterclockwise direction, and
(d) means for producing a second magnetic field in said strip substantially completely around said aperture in a direction orthogonal to said first magnetic field, the magnitudes of said magnetic fields being such that said first magnetic field is incapable of irreversibly switching the flux in said strip around said aperture but both fields acting concurrently are capable of irreversibly switching the flux in said strip into a selected circumferential direction around said aperture according to the clockwise or counterclockwise direction of said first magnetic field, thereby storing selected digital information in the portion of said strip surrounding said aperture.

11. A magnetic memory comprising:
(a) a unitary conductive and magnetizable strip having at least one aperture therein defining a closed magnetic loop,
(b) a conductor passing through said aperture,
(c) means for selectively passing current through said conductor for establishing a first magnetic field extending in a selected circumferential direction around said aperture in said magnetic loop thereby to establish a remanent magnetization extending in the same circumferential direction, and
(d) means for passing current through said strip for producing a second magnetic field in said loop orthogonal to said first magnetic field at substantially each point in said loop, the magnitudes of said magnetic fields being such that said first magnetic field is incapable of irreversibly switching the flux in said loop but both fields acting concurrently are capable of irreversibly switching the flux in said loop into a selected circumferential direction around said aperture for thereby storing selected digital information in said loop.

References Cited

UNITED STATES PATENTS

| | | | |
|---|---|---|---|
| 2,825,046 | 2/1958 | Herbert | 340—174 |
| 3,004,243 | 10/1961 | Rossing | 340—174 |
| 3,192,512 | 6/1965 | Korkowski | 340—174 |
| 3,148,358 | 9/1964 | Snyder | 340—174 |

OTHER REFERENCES

IBM Technical Disclosure Bulletin; "Cross Core Memory Construction," Anderson, Leilick and Redfield; December 1962, vol. 5, No. 7, p. 60.

STANLEY M. URYNOWICZ, Jr., Primary Examiner